US007298870B2

(12) United States Patent
Ikeda et al.

(10) Patent No.: US 7,298,870 B2
(45) Date of Patent: Nov. 20, 2007

(54) GRANULE COLOR SORTING APPARATUS WITH DISPLAY CONTROL DEVICE

(75) Inventors: Norimasa Ikeda, Tokyo (JP); Nobuyoshi Ikeda, Tokyo (JP)

(73) Assignee: Satake Corporation, Tokyo (JP)

( * ) Notice: Subject to any disclaimer, the term of this patent is extended or adjusted under 35 U.S.C. 154(b) by 675 days.

(21) Appl. No.: 10/931,568

(22) Filed: Aug. 31, 2004

(65) Prior Publication Data

US 2005/0067332 A1 Mar. 31, 2005

(30) Foreign Application Priority Data

Sep. 4, 2003 (JP) ............................ 2003-312286

(51) Int. Cl.
*G06K 9/00* (2006.01)

(52) U.S. Cl. ........................ 382/108; 382/141; 348/92; 356/2

(58) Field of Classification Search ................ 382/100, 382/108, 111, 141, 181, 195; 348/92, 205; 356/73.1, 426
See application file for complete search history.

(56) References Cited

U.S. PATENT DOCUMENTS

| | | | |
|---|---|---|---|
| 2,504,731 | A | 4/1950 | Rose et al. |
| 2,587,686 | A | 3/1952 | Berry |
| 2,680,517 | A | 8/1954 | Koemer |
| 3,701,419 | A | 10/1972 | Hutter et al. |
| 3,738,484 | A | 6/1973 | Hoover et al. |
| 3,749,240 | A | 7/1973 | Spears et al. |
| 3,802,558 | A | 4/1974 | Rhys |
| 3,990,581 | A | 11/1976 | Tengsater |
| 4,088,227 | A | 5/1978 | Lockett |
| 4,099,620 | A | 7/1978 | Kendall et al. |
| 4,231,478 | A | 11/1980 | Stone |
| 4,236,640 | A | 12/1980 | Knight |
| 4,314,645 | A | 2/1982 | Perkins, III et al. |
| 4,319,269 | A | 3/1982 | Kajiura et al. |

(Continued)

FOREIGN PATENT DOCUMENTS

| | | |
|---|---|---|
| JP | 2-204213 | 8/1990 |

(Continued)

*Primary Examiner*—Bhavesh M Mehta
*Assistant Examiner*—Anand Bhatnagar
(74) *Attorney, Agent, or Firm*—Wells St. John, P.S.

(57) ABSTRACT

A color sorting apparatus capable of displaying images of granules picked up by a CCD sensor on a panel and performing sensibility control of defective granules while observing the displayed images is provided. The color sorting apparatus comprises a contour processor for outputting contour binary data from the picked-up images and a contour threshold, a first defective determination circuit for outputting the defective part of the granule having a predetermined area or more of part exceeding a first threshold in the form of first defective pixel binary data, and a second defective determination circuit for outputting the defective part of the granule having a part exceeding a second threshold being greater than the first threshold in the form of second defective pixel binary data. The first defective pixel binary data are displayed on a monitor for thin coloration. The second defective pixel binary data are displayed on a monitor for partial coloration. The, contour binary data and, the first and second defective pixel binary data are combined, and the combined data are displayed on a granule display monitor. An operator can adjust the respective thresholds while observing those displays.

8 Claims, 6 Drawing Sheets

U.S. PATENT DOCUMENTS

| | | | |
|---|---|---|---|
| 4,367,817 A | | 1/1983 | Satake |
| 4,420,390 A | | 12/1983 | Carr |
| 4,466,544 A | | 8/1984 | Satake et al. |
| 4,520,702 A | | 6/1985 | Davis et al. |
| 4,576,482 A | | 3/1986 | Pryor |
| 4,581,632 A | | 4/1986 | Davis et al. |
| 4,718,559 A | | 1/1988 | Kenny et al. |
| 4,738,175 A | | 4/1988 | Little et al. |
| 4,829,380 A | | 5/1989 | Iadipaolo |
| 4,853,533 A | | 8/1989 | Little et al. |
| 4,896,836 A | | 1/1990 | Mitchell |
| 4,906,099 A | | 3/1990 | Casasent |
| 5,060,290 A | | 10/1991 | Kelly et al. |
| 5,090,574 A | | 2/1992 | Hamby |
| 5,119,205 A | | 6/1992 | Lemleson |
| 5,151,822 A | | 9/1992 | Hekker et al. |
| 5,197,607 A | | 3/1993 | Hå kansson |
| 5,283,641 A | | 2/1994 | Lemleson |
| 5,318,173 A | | 6/1994 | Datari |
| 5,335,293 A | | 8/1994 | Vannelli et al. |
| 5,487,472 A | | 1/1996 | Satake et al. |
| 5,509,537 A | | 4/1996 | Crismon et al. |
| 5,526,437 A | | 6/1996 | West |
| 5,659,624 A | | 8/1997 | Fazzari et al. |
| 5,757,474 A | * | 5/1998 | Sopori et al. ................. 356/72 |
| 5,779,058 A | * | 7/1998 | Satake et al. ............... 209/581 |
| 5,907,396 A | * | 5/1999 | Komatsu et al. ......... 356/237.1 |
| 5,965,446 A | * | 10/1999 | Ishikawa ....................... 436/5 |
| 6,285,449 B1 | * | 9/2001 | Ellingson et al. ........ 356/237.1 |
| 6,449,035 B1 | * | 9/2002 | Batchelder ............... 356/237.1 |
| 6,553,323 B1 | * | 4/2003 | Obara et al. .................. 702/35 |
| 6,731,384 B2 | * | 5/2004 | Ohshima et al. ......... 356/237.2 |

FOREIGN PATENT DOCUMENTS

| | | |
|---|---|---|
| JP | 09-113454 | 5/1997 |
| JP | P2001-179187 | 7/2001 |

* cited by examiner

GRANULE COLOR SORTING APPARATUS WITH DISPLAY CONTROL DEVICE

This application relates to and claims a priority from corresponding Japanese Patent Application No. 2003-312286 filed on Sep. 4, 2003.

BACKGROUND OF THE INVENTION

1. Field of the Invention

The present invention relates to a color sorting apparatus for granules, and more particularly to a color sorting apparatus equipped with a display control device that is configured to be able to sense images of a granule picked up by a CCD sensor to thereby display the images on an operation panel and perform detection sensibility control for the defective granules while observing the displayed images.

2. Description of the Related Art

When performing the control of the background or sensibility in the conventional color sorting apparatus, sensor signals were displayed on an oscilloscope or a touch panel to carry out the control while observing the displayed signals. More particularly, in the conventional sensibility control of thinly-coloration and partly-coloration for the defective granules such as thinly-colored granules and partly-colored granules, the falling level of signals to be regarded as the defective granule has been carried out based on the magnitude of the falling with respect to the background signal level being set to 100% while observing the actual sorting condition. The key map of the conventional sensibility control is shown in FIG. 6. In this figure, it is shown that a granule whose sensed level being fallen to 75% or less with respect to the background signal level being set to 100% is determined as the thinly-colored defective granule, and a granule whose sensed level being fallen to 50% or less with respect to the same is determined as the partly-colored defective granule.

The above explained conventional background control and sensibility control greatly depend on human senses and experiences since such controls are carried out while observing the actual sorting condition, and the matters of how a CCD sensor actually senses the granule and on what basis the signal processing section detects a granule as a defective granule had been estimated on the basis of the results of the actual sorting, without clarifying such matters.

However, when such controls are made only based on the actual sorting results, there have been cases in which the background control and the sensibility control do not always accurately associate with the sorting results, since the sorting results are also influenced by other factors including the performance, timing control and the like of an ejector which is arranged at the downstream side of a sensing means for the defective granules.

Another conventional technique is disclosed in Japanese Patent Application Kokai-Publication No. 11-94749. In this disclosure, there is disclosed a technique wherein the frequency distribution of quantity of light of the respective light received data is displayed on an operation panel of a color sorting apparatus and an operator can set up an appropriate range of quantity of light (i.e., a difference between the upper limit threshold and the lower limit threshold) while observing the display. However, the technique of this disclosure also is directed to determine whether the control or setting of the threshold is appropriately carried out or not from the actual sorting results. Hence, this technique is not different from the foresaid prior art in terms of that the control is dependent on senses and experiences of the operator.

As described above, in either of the above-explained prior arts, the determination whether the respective thresholds in order to sense the defective granules are in the state being properly set up or not has been made by observing the actually-sorted defective granules. Further, based on the sorting results, the controls of the respective thresholds were repeatedly executed by necessity until the sorting results have come to be the proper sorting results in view of human senses and experiences.

SUMMARY OF THE INVENTION

Therefore, in order to overcome the foresaid disadvantages in the prior arts, it is a first object of the present invention to provide a color sorting apparatus that displays images of a granule picked up by an imaging apparatus such as a CCD sensor on an operation panel to permit an operator to accurately perform the sensibility control while observing the displayed images.

Further, it is a second object of the present invention to provide a color sorting apparatus that has a performance to separately display a defective granule with a densely-colored part (hereinafter referred to as a partly-colored granule) and a different defective granule having a given area or more of thinly-colored part (hereinafter referred to as a thinly-colored granule) based on different thresholds in addition to the display of the whole images of a granule picked up by an imaging sensing apparatus.

Still further, it is a third object of the present invention to provide a color sorting apparatus that can come back to the past after the sorting to display and check on what signal basis was the individual defective granule detected as the defective granule.

The granule color sorting apparatus equipped with a display control device according to the present invention, that can achieve the objects of the present invention as described above, is characterized by comprising:

- a transferring means for transferring granules consecutively;
- an illuminating means for illuminating the transferred granules at a position for detection;
- an imaging means for imaging the illuminated granules at the position for detection;
- a contour processing means for outputting the contour of a granule as contour binary data based on a comparison of an image signal of the imaging means and a contour threshold;
- a defective determination means for determining a granule with a part exceeding a threshold that corresponds to a predetermined density as the defective granule and outputting the defective part of the defective granule in the form of defective pixel binary data;
- a granule display means for combining the defective pixel binary data output from the defective determination means to the contour binary data output from the contour processing means to display granules;
- a defective display means for displaying the defective pixel binary data output from the defective determination means; and
- a threshold adjustment means for altering thresholds while observing the respective display means.

In the color sorting apparatus described above, the defective determination means comprises a first defective determination means for determining a granule having a given area or more of part exceeding a first threshold that corresponds to a first density as the defective granule and outputting said defective part in the form of first defective pixel binary data, and a second defective determination means for determining a granule having a part exceeding a second threshold that corresponds to a second density being denser than the first density as the defective granule and outputting said defective part in the form of second defective pixel binary data.

In the color sorting apparatus described above, the first defective pixel binary data represents the thin and large colored part (thinly-colored granule), while the second defective pixel binary data represents the densely-colored part (partly-colored granule).

In the color sorting apparatus described above, said given area is determined in accordance with the number of sequential pixels each exceeding the first threshold level.

In the color sorting apparatus described above, the defective display means comprises a first defective display means for displaying a first defective pixel binary data output from a first defective determination means and a second defective display means for displaying a second defective pixel binary data output from a second defective determination means.

In the color sorting apparatus described above, the first defective display means represents a monitor for thinly-colored one, and the second defective display means represents a monitor for partly colored one.

The above-described color sorting apparatus may further comprise an image memory for storing the contour binary data and the defective pixel binary data.

In the color sorting apparatus described above, the thresholds may be changed or adjusted manually.

With the granule color sorting apparatus equipped with a display control device according to the present invention, since the sensibility can be controlled after confirming the defective granules determined as defective based on the set-up sensibility by means of a display means, it is possible to perform more accurate sensibility controls than the prior arts in which the sensibility control, etc. are carried out while observing the actually sorted granules.

With the granule color sorting apparatus equipped with a display control device according to the present invention, the respective thresholds can be adjusted separately, since the defective granule having a part with dense coloration (partly-colored granules) and the defective granule with a given area or more of thinly-colored part (thinly-colored granules), those which are sensible based on different thresholds in addition to the whole image of the granules, can be separately displayed.

With the granule color sorting apparatus equipped with a display control device according to the present invention, trouble shooting can be facilitated, since it is possible to fully separate a part for which the defective determination of a granule is carried out from an eliminating means using an ejector which is arranged at the downstream side of the part in terms of the accuracy. More particularly, the operator can immediately know, when the sorting results are unsatisfactory, the reason of such unsatisfactory results is due to either the defective or improper fixing or adjustment of the ejector, even though the sensibility control is favorably set up by the display control device.

BRIEF DESCRIPTION OF THE DRAWINGS

The above and other objects, features and advantages of the present invention will be apparent from the following description of preferred embodiments of the invention explained with reference to the accompanying drawings, in which.

REFERRED EMBODIMENT OF THE INVENTION

Hereinafter, a preferred embodiment for carrying out the present invention will be described with reference to an example shown in the attached drawings.

Figure 1:
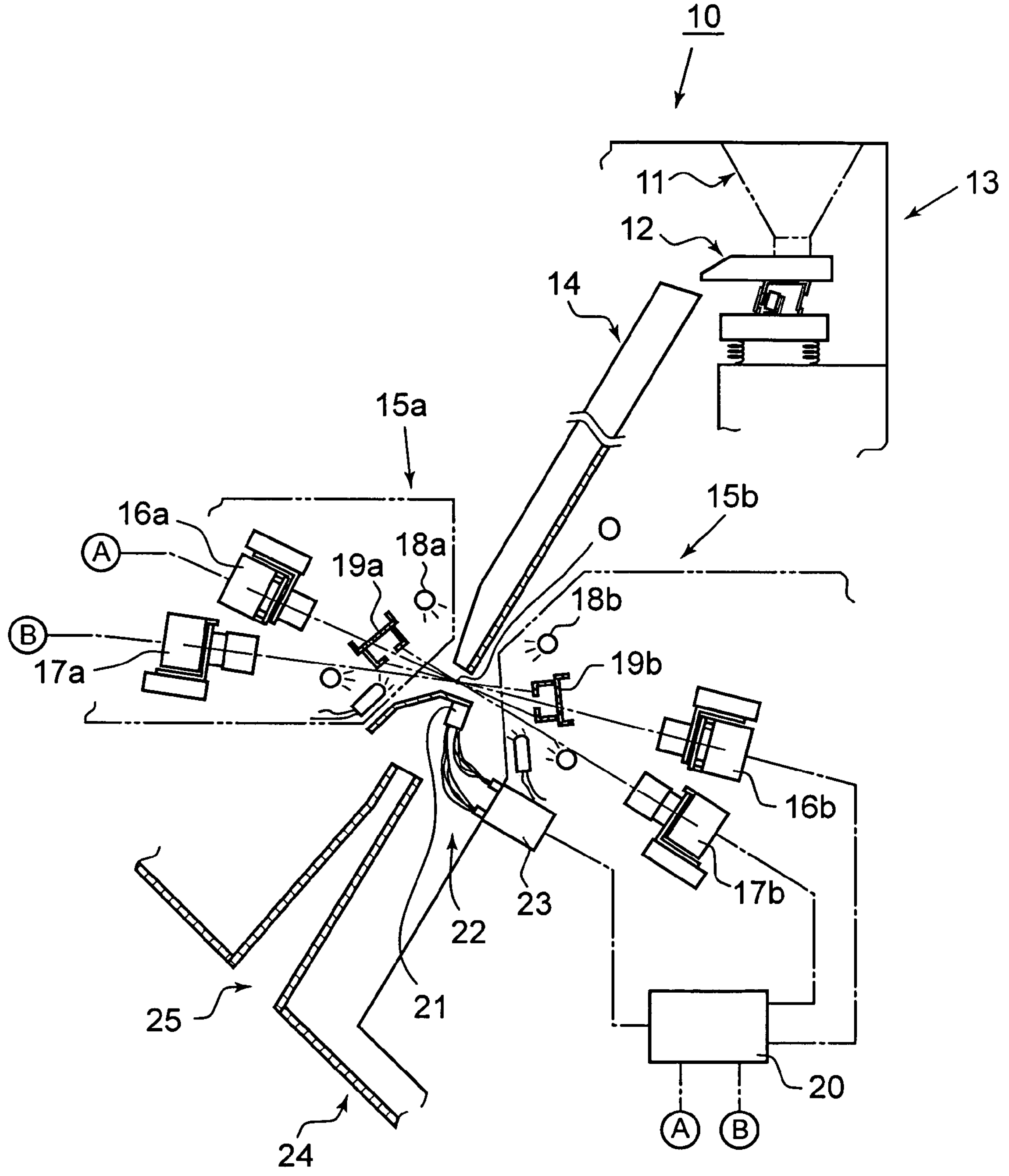
FIG. 1 is a schematic cross section of the color sorting apparatus according to the present invention when viewing it from the side direction.

FIGS. 1 through 5 respectively show an example of the embodiment for carrying out the present invention. FIG. 1 is a schematic cross section of the major portion and internal structure of the color sorting apparatus 10 according to the present invention when they are viewed from the side direction. The color sorting apparatus 10 has a granule feeding section 13 comprising a tank or hopper 11 and a vibrating feeder 12. It should be noted that typical granules are rice grains but not limited to the rice grains. The granules fed from the granule feeding section 13 naturally flow down consecutively through an inclined chute 14 having a predetermined width through which the granules lining in the transverse direction at a given distance can flow down and then are discharged from the bottom end of the chute into air along with a predetermined falling locus.

In the surrounding of the predetermined falling locus, at least a pair of optical detection units 15*a*, 15*b* are symmetrically arranged such that they have said falling locus in the center therebetween. The optical detection unit 15*a* comprises CCD line sensors 16*a*, 17*a*, a lamp 18*a*, a background plate 19*a*, etc. Similarly, the other optical detection unit 15*b* comprises CCD line sensors 16*b*, 17*b*, a lamp 18*b*, a background plate 19*b*, etc. The CCD line sensors 16*a*, 17*a*, 16*b*, 17*b* in the optical detection units 15*a*, 15*b* pick up images of the granules having reached the detecting position O in the falling locus and transmit the image pickup signals to a controller 20 that will be described in detail later. The controller 20 performs to specify the contours of the granules and the determination of the defective granules in accordance with the image pickup signals output from the CCD line sensors. The controller including its constitution will be described in detail later. When the controller 20 has detected the defective granule, an elimination signal is transmitted from the controller 20 toward an open-and-close valve 23 of an eliminating unit 22 containing an air nozzle 21 therein. The eliminating unit 22 ejects air through the air nozzle 21 to blow out only the defective granules from the given falling locus to eliminate them to the outside of the color sorting apparatus through a defective elimination port 24 in accordance with elimination signals transmitted from the controller 20. The normal granules having passed through the given falling locus, for those which the eliminating unit 22 was not actuated, are collected through a normal granule collection port 25.

Figure 2:
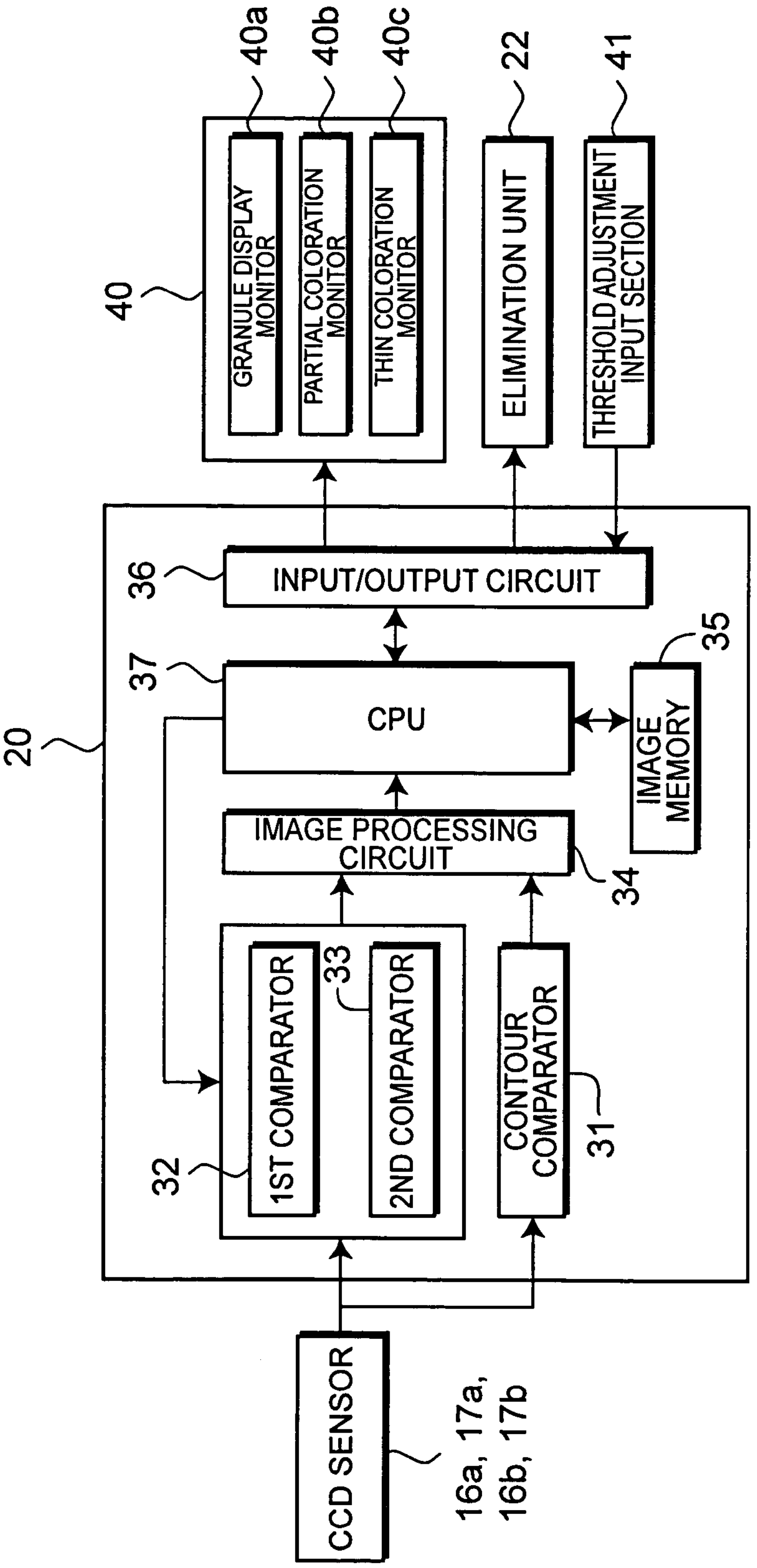
FIG. 2 is a block diagram of a controller for the color sorting apparatus according to the present invention.

Next, the controller 20 that processes the image pickup signals output from the CCD line sensors 16*a*, 17*a*, 16*b*, 17*b* in the optical detection units 15*a*, 16*a* will be described with reference to FIG. 2. The controller 20 includes: a contour comparator 31 in which a contour threshold is set up; a first comparator 32 in which a first threshold corresponding to a first density is set up; a second comparator 33 in which a second threshold corresponding to a second density that is denser than the first density is set up; an image processing circuit 34 for image processing output signals from the comparators described above; an image memory 35 for temporarily storing the respective images processed by the image processing circuit 34, and an input/output circuit 36 for controlling signals between an external apparatus that will be described later and the controller 20. The controller 20 further has a central processing unit (CPU) 37 as a main component that controls the operations of the respective components described above in accordance with a fixed program. The respective components described above are functionally connected or coupled therebetween through the CPU 37 as the main component.

Components connected externally to the controller 20 through the input/output circuit 36 include a display panel 40, an eliminating unit 22 and a threshold adjustment input section 41.

Figure 3:
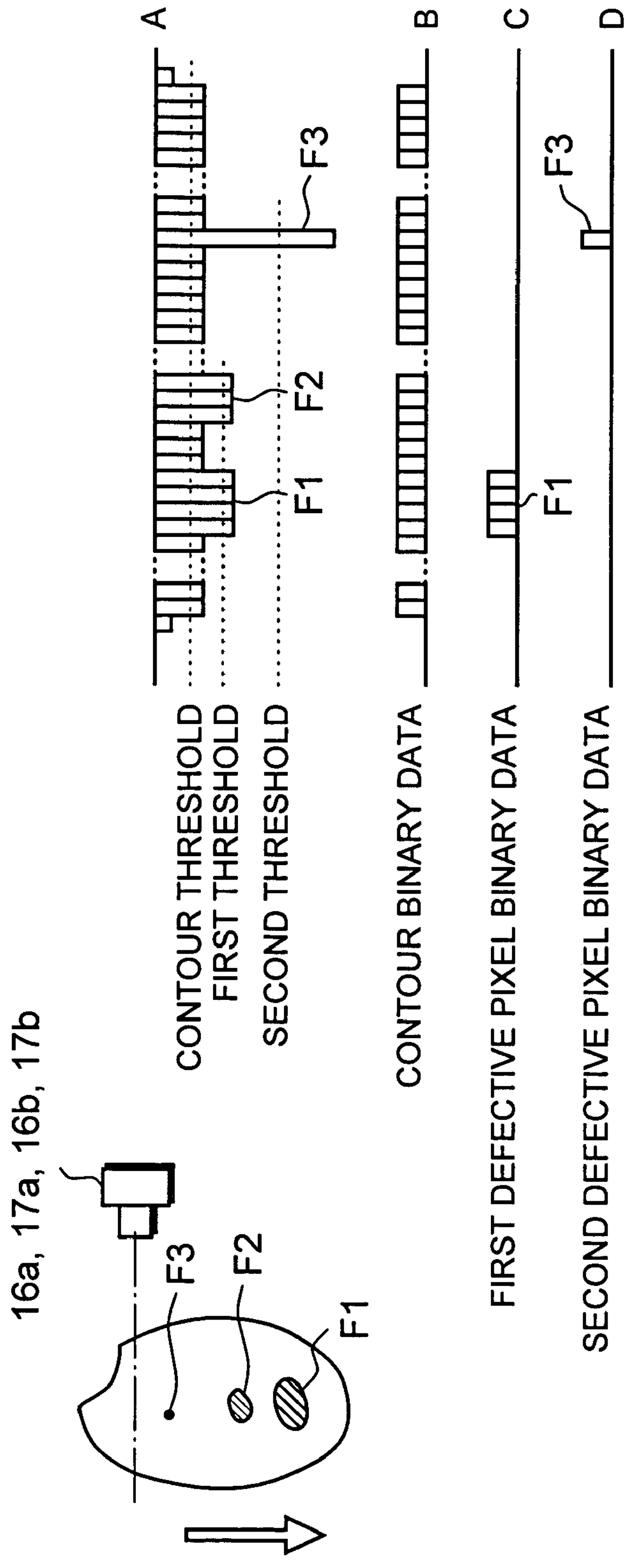
FIG. 3 is a view showing signals received by a CCD sensor and the binary signals.

Now, how the contours of the granules and the defective granules are detected by the contour comparator 31, the first comparator 32 and the second comparator 33 will be described hereunder with reference to FIG. 3. FIG. 3A represents signals at the time when the granules pass across the scanning line of, for example, the CCD line sensor 16*a*. At first, the contour of the granule is sensed when the granule exceeds, upon the passage, the contour threshold being set up at the lowest level, and the detected signals are sent to the image processing circuit 34 in the form of the contour binary data representing the contour of the granule as shown in FIG. 3B.

Next, in what situation the granule having a part that corresponds to the relatively thin first density is detected as the defective granules will be described hereunder. Here, it is supposed that the granule has two colored parts F1, F2 each having a relatively thin first density and a different area. In this case, signals exceeding the first threshold corresponding to the first density appear at two locations that correspond to said colored parts F1, F2 in the signal waveforms shown in FIG. 3A. The areas of the colored parts correspond to the number of pixels. It is appreciated that the number of pixels in the thinly-colored part F1 locating at the first position in the advance direction is four (4), while the number of pixels in the colored part F2 locating at the second position is three (3). In the embodiment of the present invention, signals output from the first comparator 32 is set up such that only the thinly-colored part having pixels more than four (4) is represented as the defective granule. With the setting-up described above, only the data corresponding to the colored part F1 appears in the first defective pixel binary data that represents the defective granules exceeding the first threshold shown in FIG. 3C, and is sent to the subsequent image processing circuit 34. Since the granule having only a part, for example, the part F2, although it is thinly-colored but the colored area is relatively small, is treated as the normal granule in the present invention, it is possible to improve the yield of the sorting operation.

Next, how the granule having a colored part F3 that corresponds to the second density being denser than the first density is detected as the defective granule will be described hereunder. In this case, signals exceeding the second threshold that corresponds to the second density appear in response to the part F3 in the signal waveforms shown in FIG. 3A. In this case, since the signal has the dense colored part, the granule is recognized as the defective granule irrespective of the magnitude of the area of the colored part, and the detected signal is transmitted to the image processing circuit 34 in the form of the second defective pixel binary data that represents the defective part exceeding the second threshold shown in FIG. 3D.

Though it was supposed in the above description that the granule has two thinly-colored parts with different areas and one densely-colored part, the actual number of the colored parts in the granule is uncertain. It is appreciated from the description above that the granule can be determined as the normal granule if all the colored parts in the granule are only the part that corresponds to the part F2 described above of which colored part has a relatively-small area and is thin-colored, because such colored parts will not give much unacceptable disadvantageous effect on the product quality.

Figure 4:
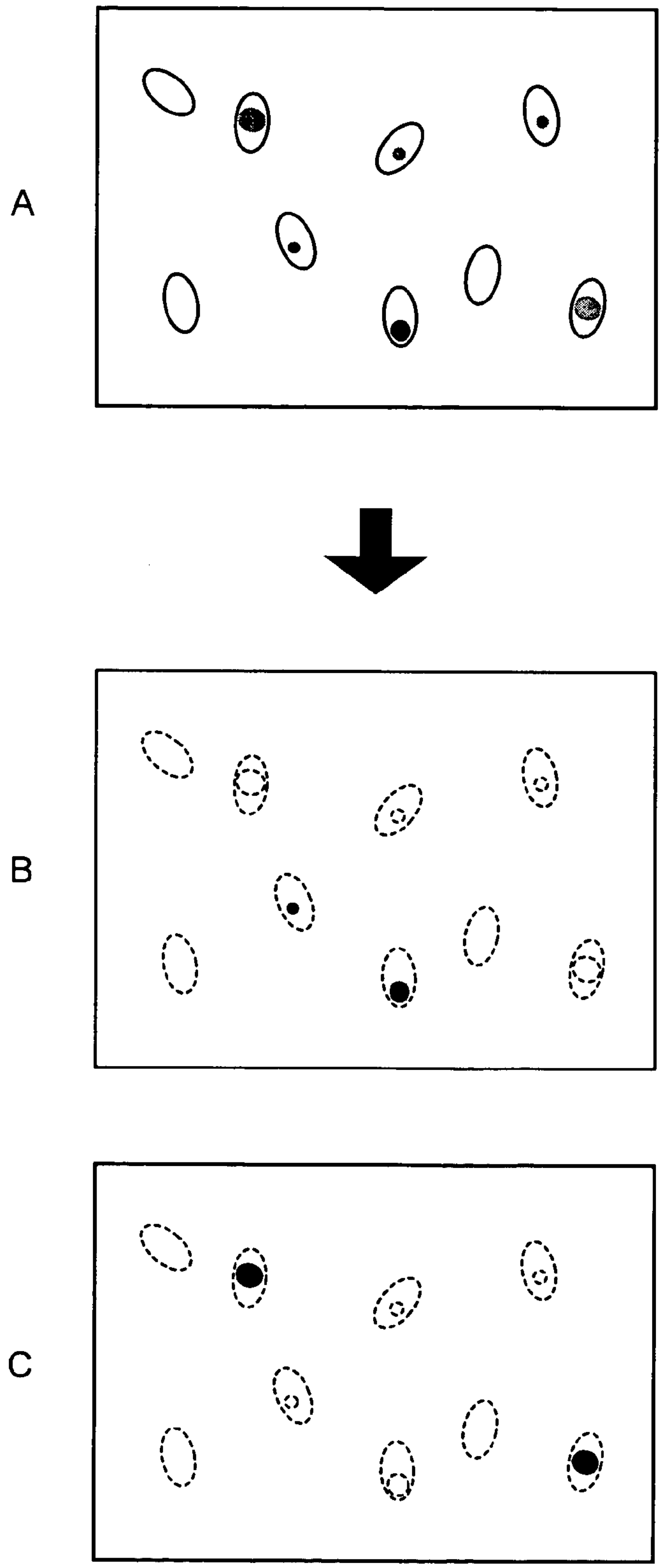
FIG. 4 is a view showing the whole image of granules and the defective parts, those which are displayed on a display panel.

Next, in what manner the image of a granule picked up by the CCD sensor is displayed on the display panel 40 will be described hereunder with reference to FIG. 4. The display control device according to the present invention is set up such that it is actuated only at the adjustment time before starting the steady-state or running operation. The sample of the granules to be used at the time of the adjustment is a mixture of the normal granules and the defective granules having colored parts of which area and density have been known in advance. When flowing the sample of the granules in the color sorting apparatus according to the present invention, the density and area of the colored parts are combined by the image processing circuit 34 shown in FIG. 2 with the contours of the respective granules, and the combined images are displayed on a granule display monitor 40*a* arranged onto the display panel 40. That is to say, FIG. 4A represents the whole image of the flowing-down sample of granules picked up by the CCD sensor. Since the flow of the sample of the granules will be too fast when directly displaying the state of the actual down flow and it will be difficult for the operator to observe the display, it is preferable to once store the picked-up images in the image memory 35, reduce the speed of the image display to a proper speed, and display them in a slow display mode. Alternatively, it is also possible to display the picked-up images in the form of still images, if required.

FIG. 4B shows such a state that the second defective pixel binary data output from the second comparator 33 in which the dense second threshold is set up as a value to be compared display only the densely-colored granules having been determined as the defective on the monitor 40*b* for the partial coloration, arranged onto the display panel 40 via the image processing circuit 34 and the input/output circuit 36. The broken lines in the drawings expediently show granules corresponding to the respective granules displayed on the granule display monitor 40*a*, and those granules with the broken lines are not displayed actually on the monitor. It may be appreciated that the densely-colored granules are displayed irrespective of the magnitudes of those areas because of the defective detection based on the second threshold. It is also possible to configure such that the number of pixels in the colored part is displayed in response to a touch by an operator to said colored part displayed on the monitor 40*b* for the partial coloration.

FIG. 4C shows such a state that the first defective pixel binary data output from the first comparator 32 in which the first threshold is set up as a value to be compared display only the thinly-colored granules having been determined as the defective on the monitor 40*c* for the thin coloration, arranged onto the display panel 40 via the image processing circuit 34 and the input/output circuit 36. Like as described above, the broken lines in the drawings expediently show granules corresponding to the respective granules displayed on the granule display monitor 40*a*, and those granules with the broken lines are not displayed actually on the monitor. In this case, it is required to take the area of the colored granules into consideration because of the defective determination based on the first threshold. Only the colored granules each having a given area or more are displayed as the defective granules on the monitor 40*c* for the thin coloration. It may be appreciated that the two granules each having an area less than the predetermined area locating at the top right on the granule display monitor 40*a* are not recognized as the defective, and they are treated as the normal granules. Note that, in this case, as well as the previous case, it is possible to configure such that the number of the pixels in the thinly-colored part is displayed in response to an operator's touching to said part displayed on the monitor 40*c* for the thin coloration.

Since an elimination signal is emitted from the controller 20 to the eliminating unit 22 via the input/output circuit 36 with respect to the granules displayed as the defective granules on the monitor 40*b* for the partial coloration and the monitor 40*c* for the thin coloration, the operator can understand that the operational timing and the like of the eliminating unit 22 is not properly adjusted when no granule that corresponds to the foresaid defective granules is contained in the defective granules in the sorted-out-granules. Therefore, trouble shooting can be made quite easily with the color sorting apparatus according to the present invention.

When the granules having been not treated as the defective granules but treated as the normal granules, for example, at the previous adjustment time, after that the respective thresholds were once adjusted, (e.g., two thinly-colored granules displayed at the top right on the granule display monitor 40*a* shown in FIG. 4A), are newly required to be treated as the defective granules, such a change can be readily achieved by altering the number of pixels described in connection with FIG. 3 from four (4) to three (3) or by operating a threshold adjustment input section 41 to alter the threshold itself. Since the adjustment state of the previous time has been stored in the image memory 35, such resetting-up and altering can be readily made. Whether the intended sorting of the granules has been performed by altering the thresholds or making the resetting-up or not can be readily confirmed by flowing and then sorting the sample of the granules again.

Figure 5:
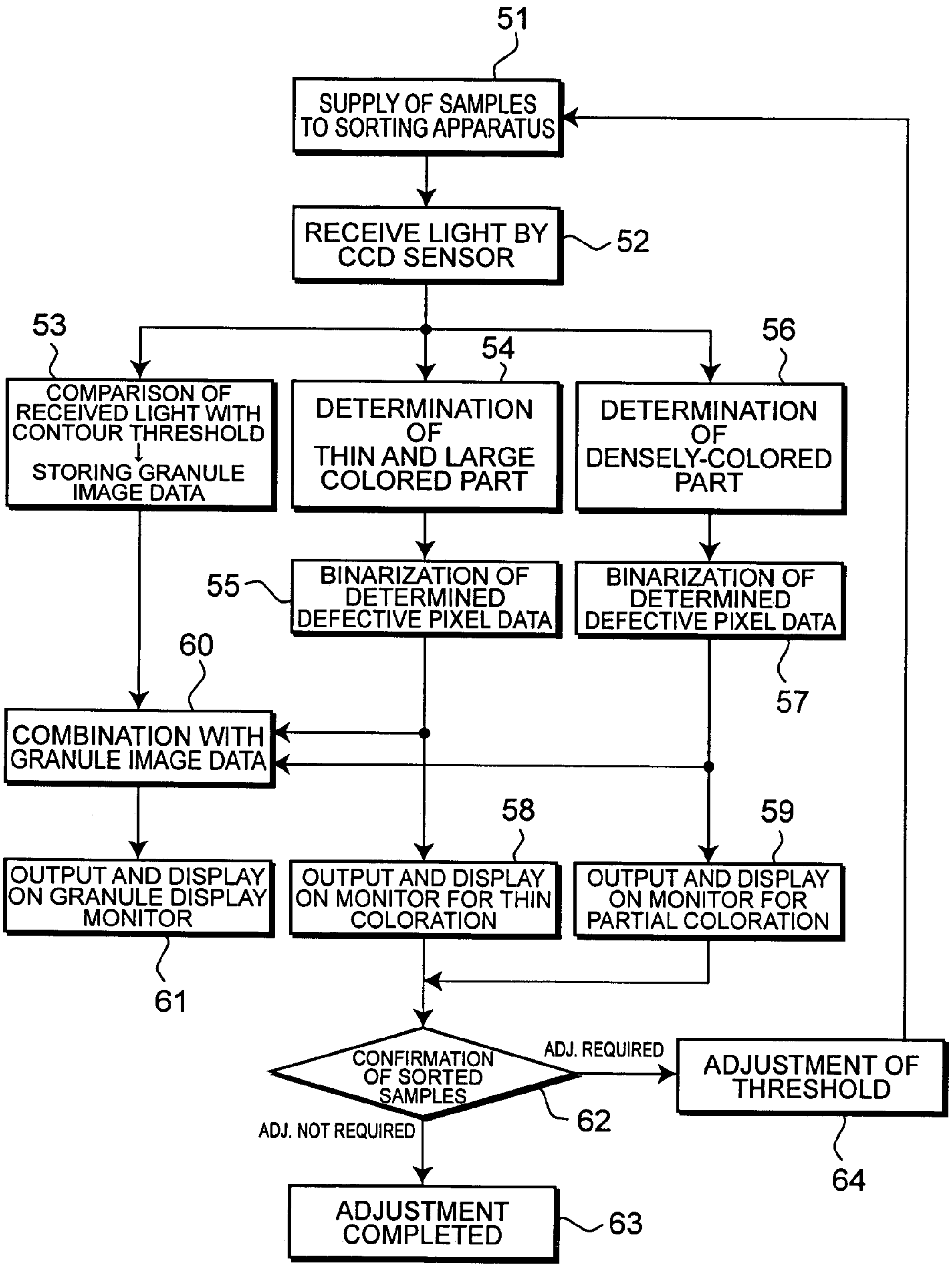
FIG. 5 is a flow chart showing the sensibility control operation to be performed in the color sorting apparatus according to the present invention.
Figure 6:
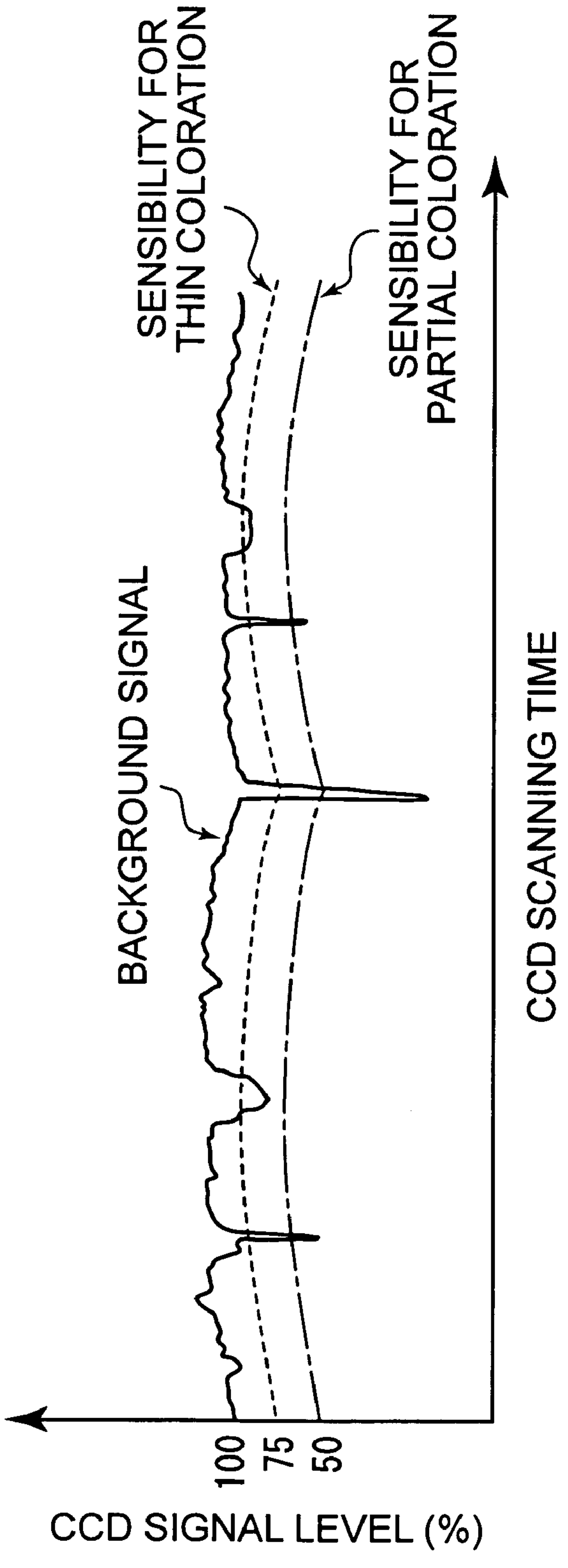
FIG. 6 is a view representing the conception of the sensibility control.

Now, the flow of the sensibility control operation to be carried out prior to the steady-state or running operation will be described hereunder with reference to FIG. 5. Raw materials or the sample of the granules are fed into the color sorting apparatus 10 according to the present invention in Step 51, and the operation then starts. When the sample of the granules has reached the detection position, the images of the sample are picked up by the CCD sensor in Step 52. The picked-up image signals are simultaneously fed to the contour comparator 31, the first comparator 32 and the second comparator 33 in parallel. In the contour comparator 31, a comparison with the contour threshold is carried out, and the contour binary data representing the contours of the respective granules are output in Step 53. Alongside of Step 53, the picked-up image signals are compared with the first threshold that corresponds to the relatively-thin first density by the first comparator 32 in Step 54 to produce the binary data. At this time, only the case where a granule having a predetermined number or more of pixels exceeding the first threshold is sequentially sensed in Step 55, such granule is determined as the defective one and is output in the form of the first defective pixel binary data. Alongside of Steps 53 and 54, the picked-up image signals are compared with the second threshold that corresponds to the relatively-dense second density in Step 56, and the binary data are produced when the signals exceed the second threshold. In this case, the granules are determined as the defective granules in Step 57 irrespective of the number of the pixels exceeding the second threshold, and the defective granules are output in the form of the second defective pixel binary data. The first defective pixel binary data obtained in Step 55 are displayed as the thinly-colored granules on the monitor 40*c* for the thin coloration in Step 58. In Step 59, the second defective pixel binary data obtained in Step 57 are displayed in the form of the partly-colored granules on the monitor 40*b* for the partial coloration. In Step 60, the contour binary data obtained in Step 53, the first defective pixel binary data obtained in Step 55 and the second defective pixel binary data obtained in Step 57 are combined in the image processing circuit 34. The combined images obtained in Step 60 are displayed on the granule display monitor 40*a* in Step 61. In Step 62, it is checked visually whether the granules determined as the defective granules in Steps 58 and 59 are properly eliminated (separated) in the separation process or not. When it was confirmed visually that the defective granules are properly eliminated or sorted out, a series of adjusting operations are finished in Step 63, and the operation is then shifted to the steady-state operation. As a result of the checking in Step 62, when it is noted that the control is required, a new threshold is set up by the threshold adjustment input section 41 in Step 64, and the operation comes back to Step 51 where feeding of the initial sample is carried out. Afterwards, the steps described above are carried out once again.

Note that the color sorting apparatus equipped with a display control device according to the present invention is not limited to the scope of the above-described examples shown by the drawings, and it is naturally feasible to apply various modifications and variation to this invention within a range not departing from the subject matter of the present invention.

What is claimed is:

1. A granule color sorting apparatus equipped with a display control device, comprising:

a transferring means for transferring granules consecutively;

an illuminating means for illuminating the transferred granules at a detection position;

an image pickup means for picking up images of the illuminated granules at the detection position;

a contour processing means for outputting the contour of the granule in the form of contour binary data based on a comparison of an image signal of the image pickup means with a contour threshold;

a defective determination means for determining the granule having a part exceeding a threshold that corresponds to a predetermined density as a defective granule and outputting the defective part of the defective granule in the form of defective pixel binary data;

a granule display means for combining the defective pixel binary data output from the defective determination means into the contour binary data output from the contour processing means and displaying the combined data;

a defective display means for displaying the defective pixel binary data output from the defective determination means; and a threshold adjustment means for altering a threshold while observing the respective display means.

2. The granule color sorting apparatus according to claim 1, wherein the defective determination means comprises:

a first defective determination means for determining a granule having a predetermined area or more of part that exceeds a first threshold corresponding to a first density as the defective granule and outputting the defective part in the form of first defective pixel binary data; and a second defective determination means for determining a granule having a part exceeding a second threshold that corresponds to a second density being denser than the first density as the defective granule and outputting the defective part in the form of second defective pixel binary data.

3. The granule color sorting apparatus according to claim 2, wherein the first defective pixel binary data represents a thin and large part (thinly-colored granule), and the second defective pixel binary data represents a densely-colored part (partly-colored granule).

4. The granule color sorting apparatus according to claim 2, wherein the predetermined area is determined in accordance with the number of pixels in series that exceed the first threshold.

5. The granule color sorting apparatus according to claim 2, wherein the defective display means comprises:

a first defective display means for displaying the first defective pixel binary data output from the first defective determination means; and a second defective display means for displaying the second defective pixel binary data output from the second defective determination means.

6. The granule color sorting apparatus according to claim 5, wherein the first defective display means is a monitor for thin coloration and the second defective display means is a monitor for partial coloration.

7. The granule color sorting apparatus according to claim 1, wherein the color sorting apparatus further comprises an image memory for storing the contour binary data and the defective pixel binary data.

8. The granule color sorting apparatus according to claim 1, wherein the thresholds are manually adjusted by the threshold adjustment means.

* * * * *